(12) United States Patent
Merkert

(10) Patent No.: US 11,573,081 B2
(45) Date of Patent: Feb. 7, 2023

(54) METHOD FOR MEASURING A WORKPIECE

(71) Applicant: Klingelnberg GmbH, Hückeswagen (DE)

(72) Inventor: Benjamin Merkert, Wipperfürth (DE)

(73) Assignee: KLINGELNBERG GMBH, Huckeswagen (DE)

( * ) Notice: Subject to any disclaimer, the term of this patent is extended or adjusted under 35 U.S.C. 154(b) by 0 days.

(21) Appl. No.: 17/520,906

(22) Filed: Nov. 8, 2021

(65) Prior Publication Data

US 2022/0146260 A1    May 12, 2022

(30) Foreign Application Priority Data

Nov. 11, 2020    (EP) ..................... 20207042

(51) Int. Cl.
*G01B 21/10*    (2006.01)
*G01B 21/20*    (2006.01)
*G01B 21/30*    (2006.01)

(52) U.S. Cl.
CPC ............. *G01B 21/10* (2013.01); *G01B 21/20* (2013.01); *G01B 21/30* (2013.01)

(58) Field of Classification Search
CPC ........ G01B 21/10; G01B 21/20; G01B 21/30; G01B 5/204; G01B 5/12
See application file for complete search history.

(56) References Cited

U.S. PATENT DOCUMENTS

| | | | |
|---|---|---|---|
| 3,850,026 A | 11/1974 | Holst et al. | |
| 4,167,066 A | 9/1979 | Cooper et al. | |
| 5,351,410 A * | 10/1994 | Hainneville | G01B 5/08 33/783 |
| 6,886,264 B2 * | 5/2005 | Sakata | G01B 7/12 73/1.79 |
| 7,194,378 B2 * | 3/2007 | Gorsch | G01B 21/045 702/155 |
| 8,006,402 B2 * | 8/2011 | Yoshizumi | G01B 21/045 33/559 |
| 9,915,516 B2 * | 3/2018 | Noda | G05B 19/401 |
| 10,132,622 B2 * | 11/2018 | Ould | G01B 21/04 |

(Continued)

FOREIGN PATENT DOCUMENTS

DE    2148976 A1    4/1972

*Primary Examiner* — Yaritza Guadalupe-McCall
(74) *Attorney, Agent, or Firm* — Cantor Colburn LLP

(57) ABSTRACT

Method for measuring a workpiece, comprising the method steps of: providing a workpiece, wherein the workpiece has a surface with a surface structure; predefining a geometric measured variable of the workpiece, wherein the geometric measured variable is a diameter of the workpiece and wherein the geometric measured variable and a nominal-actual deviation of the geometric measured variable are defined in a reference plane; predefining a measuring path; tactile sensing of measured values on the workpiece by bringing a measuring probe into contact with the surface of the workpiece and the measuring probe scans the workpiece in contact with the surface along the predetermined measuring path; computational determination of the geometric measured variable and the nominal-actual deviation of the geometric measured variable from the measured values within the reference plane; wherein the predefined measuring path lies at least partially outside the reference plane.

10 Claims, 5 Drawing Sheets

(56) References Cited

U.S. PATENT DOCUMENTS

| | | | |
|---|---|---|---|
| 10,379,520 B2* | 8/2019 | Noda | G01B 7/008 |
| 10,697,750 B2* | 6/2020 | Hughey | G01B 5/003 |
| 2010/0119104 A1 | 5/2010 | Mamour et al. | |
| 2011/0184695 A1 | 7/2011 | Grzesiak | |
| 2015/0377617 A1 | 12/2015 | Ould | |
| 2016/0195382 A1* | 7/2016 | McMurtry | G01B 5/012 33/503 |
| 2016/0341533 A1* | 11/2016 | Noda | G01B 5/008 |
| 2019/0178618 A1* | 6/2019 | McMurtry | G01B 5/012 |
| 2019/0339053 A1 | 11/2019 | Hughey | |
| 2022/0146260 A1* | 5/2022 | Merkert | G01B 21/30 |

\* cited by examiner

METHOD FOR MEASURING A WORKPIECE

CROSS-REFERENCE TO RELATED APPLICATIONS

This application is related to and claims the benefit of European Patent Application No. 20207042.1, filed on Nov. 11, 2020, the contents of which are herein incorporated by reference in their entirety.

TECHNICAL FIELD

The present disclosure relates to a method for measuring a workpiece, comprising the steps of: providing a workpiece, wherein the workpiece has a surface with a surface structure; predefining a geometric measured variable of the workpiece, wherein the geometric measured variable is a diameter of the workpiece and wherein the geometric measured variable and a nominal-actual deviation of the geometric measured variable are defined in a reference plane; predefining a measuring path; tactile sensing of measured values on the workpiece, in which a measuring probe is brought into contact with the surface of the workpiece and the measuring probe scans the workpiece in contact with the surface along the predetermined measuring path; computational determination of the geometric measured variable and the nominal-actual deviation of the geometric measured variable from the measured values within the reference plane.

BACKGROUND

Workpieces are measured to meet specified quality requirements. The method mentioned above is used to determine a nominal-actual deviation of a diameter of a workpiece. The measured nominal-actual deviation can be compared with respect to compliance with a specified tolerance.

When measuring the diameter, the surface structure of the workpiece surface can lead to the measurement result being falsified. If the surface structure has e.g. grooves, scores, furrows or the like, the measuring probe may be guided in the valleys or depressions of these grooves, scores, furrows or the like when traversing the measuring path, so that a diameter is measured incorrectly.

For example, a surface structure of a circular-cylindrical shaft section may describe a spiral groove that winds around a central axis of the circular-cylindrical shaft section due to a previous turning operation. During the measurement of the outer diameter of this circular-cylindrical shaft section, the measuring probe with its sensing ball or probe tip may run inside this groove, so that only the "valley" of the surface structure, i.e. only the minimum outer diameter is detected, but not the actual outer diameter. In other words, as far as one compares such a spiral groove of the surface structure in a highly magnified form with an external thread, in the worst case only the core diameter of such a thread would therefore be measured, but not the nominal diameter, since the measuring probe is guided between the thread flanks during the measurement.

SUMMARY

Against this background, the disclosure is based on the technical problem of providing a method which enables reliable measurement of a diameter of a workpiece whose surface has a surface structure.

The technical problem described above is solved by a method according to claim 1. Further embodiments of the disclosure result from the dependent claims and the following description.

According to the disclosure, a method is provided comprising the steps of: providing a workpiece, wherein the workpiece has a surface with a surface structure; predefining a geometric measured variable of the workpiece, wherein the geometric measured variable is a diameter of the workpiece and wherein the geometric measured variable and a nominal-actual deviation of the geometric measured variable are defined in a reference plane; predefining a measuring path; tactile sensing of measured values on the workpiece, in which a measuring probe is brought into contact with the surface of the workpiece and the measuring probe scans the workpiece in contact with the surface along the predetermined measuring path; computational determination of the geometric measured variable and the nominal-actual deviation of the geometric measured variable from the measured values within the reference plane. The disclosure is characterized in that the predetermined measuring path lies at least partially outside the reference plane.

Contrary to previously known conventions, the measuring path is therefore deliberately specified at least in sections outside of the reference plane in which the measured variable "diameter" is defined, in order to record in this way not only measured values for the diameter, but also measured values for the surface structure of the surface that may falsify the measurement. In this way, influences of the surface structure on the measurement result can be detected and calculated from the measurement result. For example, it can be specified that the measuring path intersects the reference plane at a point and/or that the measuring path and the reference plane have at most one common point.

The measuring probe may be a measuring probe with a sensing ball, wherein the sensing ball is provided for contact with the workpiece.

For example, the sensing ball may have a diameter of 0.1 mm or more. For example, the sensing ball may have a diameter of 1 mm or more. For example, the sensing ball may have a diameter of 2 mm or more. For example, the sensing ball may have a diameter of 10 mm or less. For example, the sensing ball may have a diameter of 6 mm or less. For example, the sensing ball may have a diameter of 4 mm or less.

For example, the sensing ball may comprise one of the materials of ruby, silicon nitride, zirconia, ceramic, or cemented carbide or consist of one of the materials of ruby, silicon nitride, zirconia, ceramic or cemented carbide.

The measuring probe may have a rod on which the sensing ball is held at the end. The rod may, for example, comprise one of the materials of steel, cemented carbide, ceramic, composite material, e.g. carbon fiber, aluminum or titanium or consist of one of the materials of steel, cemented carbide, ceramic, composite material, e.g. carbon fiber, aluminum or titanium.

The measuring probe can be a scanning probe and/or a touch-trigger probe.

When it is referred to herein that the geometric measured variable is a diameter of the workpiece, i.e. when it is said that a diameter is measured, this can be the measurement of an outer diameter or the measurement of an inner diameter of the workpiece.

Such an outer diameter may be measured, for example, on an outer lateral surface of a circular-cylindrical or conical shaft section. An inner diameter may be measured, for example, on an inner lateral surface of a circular-cylindrical recess, such as a bore or the like, or a conical recess.

When it is referred to herein that the geometric measured variable is a diameter of the workpiece, i.e. when it is referred to as measuring a diameter, it may be measuring a constant diameter, such as measuring a circular cross-section of a circular-cylindrical workpiece portion or the like. Alternatively, measuring a diameter may be measuring a non-constant diameter, such as measuring an elliptical cross-section of an elliptical workpiece region or the like. It is understood that measuring a diameter may also comprise measuring a radius, and vice versa.

The reference plane may be a plane oriented orthogonally to an axis of symmetry of a workpiece portion of the workpiece, i.e. including an angle of 90 degrees with the axis of symmetry at which the diameter is measured. For example, the reference plane may be oriented orthogonally to a central axis of a circular-cylindrical portion of a workpiece with respect to which the circular-cylindrical portion is rotationally symmetric. For example, the reference plane may be oriented orthogonally to a central axis of an elliptical portion of a workpiece with respect to which the elliptical portion of the workpiece is rotationally symmetric.

The reference plane may be a plane that is not orthogonal to an axis of symmetry of a workpiece portion of the workpiece, i.e. it thus encloses an angle other than 90 degrees with the axis of symmetry.

The reference plane may be a planar plane. For example, such a planar plane may be oriented parallel to a coordinate plane of a Cartesian coordinate system of a measuring machine with which the present method is performed. Alternatively, such a planar plane may not be oriented parallel to a coordinate plane of a Cartesian coordinate system of a measuring machine with which the present method is performed.

The surface structure of the workpiece may have grooves. The terms grooves, furrows and scores are used synonymously herein. It may be provided that the grooves have a width of more than 10 µm and less than 500 µm. It may be provided that the grooves have a width of more than 10 µm and less than 100 µm. It may be provided that the grooves have a width of more than 10 µm and less than 100 µm. It may be provided that the grooves have a width of more than 10 µm and less than 50 µm. It may be provided that the grooves have a depth of more than 3 µm and less than 50 µm. It may be provided that the grooves have a depth of more than 3 µm and less than 20 µm. It may be provided that the grooves have a depth of more than 5 µm and less than 15 µm, in particular have a depth of 10 µm or less.

The grooves may be helical, at least in sections. In particular, the grooves may be completely helical. The grooves may have an inclination and a direction of rotation with respect to the reference plane.

It may be provided that the inclination and/or the direction of rotation of the grooves are determined based on manufacturing parameters of a workpiece machining operation that preceded the provision of the workpiece. For example, these may be manufacturing parameters from a previous turning operation, such as the workpiece speed, the cutting speed, the infeed and the feed rate of the turning operation. For example, the turning operation may have been performed as an external longitudinal turning operation using a turning tool.

Alternatively or additionally, the inclination and/or the direction of rotation or orientation of the grooves can be detected before and/or during tactile measurement.

The terms orientation, direction of rotation and sense of rotation are used synonymously here.

It may be provided that the measuring path is predetermined or defined by taking into account the inclination and/or the direction of rotation of the grooves. In particular, it may be provided that the measuring path crosses the grooves and has, at least in sections, an inclination and/or direction of rotation deviating from the inclination and/or direction of rotation of the grooves. The measuring path may therefore purposefully extend transversely and/or in the opposite direction to the inclination and/or direction of rotation of the grooves, in order to measure a profile of the grooves in this way. In particular, a width and/or a depth of grooves of the surface structure may be measured along the measuring path.

In particular, it may be provided that the measuring path is helical at least in sections. In particular, it may be provided that the measuring path is completely helical. For example, the measuring path may be at least sectionally or completely helical in shape to the extent that, for example, a diameter is measured on a circular-cylindrical workpiece section.

In particular, it may be provided that the measuring path is spiral at least in sections. In particular, it may be provided that the measuring path is completely spiral-shaped. For example, the measuring path may be formed at least in sections or completely as a conical spiral, insofar as, for example, a diameter is measured on a conical workpiece portion.

In order to improve the measuring result, it can be provided that during the tactile measuring two or more measuring paths are scanned and that the measuring paths differ with regard to one parameter or with regard to several of the following parameters: Starting point of the measuring path, end point of the measuring path, length of the measuring path, direction of rotation or orientation of the measuring path, inclination of the measuring path. In this way, a profile of the surface or the surface structure can be reliably detected.

Measuring with two or more measuring paths can serve to detect in a tactile manner the inclination and/or direction of rotation of the grooves. Thus, measuring with two or more measuring paths can serve in particular as a preparatory measurement for a series of subsequent measurements in order to define a single measuring path that crosses the grooves for subsequent measurements. Thus, for a series of components, the inclination and/or direction of rotation of the grooves can first be detected on one component with two or more measuring paths in order to subsequently be able to perform the measurement of all subsequent components more quickly with a single measuring path derived therefrom.

In particular, the pitch and/or the direction of rotation of the grooves can be detected automatically.

It can be provided that a first measuring path and a second measuring path are predefined, wherein a starting point of the first measuring path and a starting point of the second measuring path lie in a common starting plane, wherein the starting plane is oriented in particular parallel to the reference plane, and/or wherein an end point of the first measuring path and an end point of the second measuring path lie in a common end plane, wherein the end plane is oriented in particular parallel to the reference plane, and/or the first measuring path and the second measuring path have an angular offset relative to one another. This procedure also enables an improved detection of the surface structure or a profile of the surface, in order to determine the influence of the surface structure on the measurement result of the diameter.

It can be provided that the measured values are projected onto the reference plane. In this way, within the reference plane, e.g. for measuring an outer diameter, an envelope circle or a maximum measured outer diameter and a maximum inscribed circle or a minimum measured outer diameter is obtained for example. In order to determine a measured actual value for the diameter, it may alternatively or additionally be specified that a best-fit diameter is determined by curve fitting from the measured values according to the method of least squares of error and is defined as the measured actual diameter.

The workpiece can be rotated about a longitudinal workpiece axis during measurement. In doing so, the measuring probe can be advanced radially in the direction of the workpiece. For example, it may be provided that a workpiece longitudinal axis, which may for example be a symmetry axis described above, is oriented collinearly to an axis of rotation about which the workpiece rotates during the measurement. Such an axis of rotation may, for example, be a workpiece spindle axis of a rotary table of a measuring machine, wherein the workpiece is clamped to the rotary table. It can therefore be provided that the workpiece is rotated about its own axis during the measurement, i.e. when traversing the measuring path.

It can be provided that the measuring probe is freely movable in any spatial direction during the tactile sensing of measured values on the workpiece and is not blocked in any spatial direction. The possibly occurring falsification of a measurement of the diameter by the surface structure of the workpiece is therefore not compensated in the present case by locking the measuring probe in one or more coordinate directions, but by the specific definition of the measuring path outside the reference plane of the diameter to be measured or at least in sections outside the reference plane of the diameter to be measured.

BRIEF DESCRIPTION OF THE DRAWINGS

The disclosure is described in more detail below with reference to a drawing which illustrates exemplary embodiments. The drawings schematically show in each case:

FIG. 1B shows the workpiece of FIG. 1A in a longitudinal section IB-IB according to

FIG. 1A,

DETAILED DESCRIPTION OF THE DRAWINGS

Figure 1A:
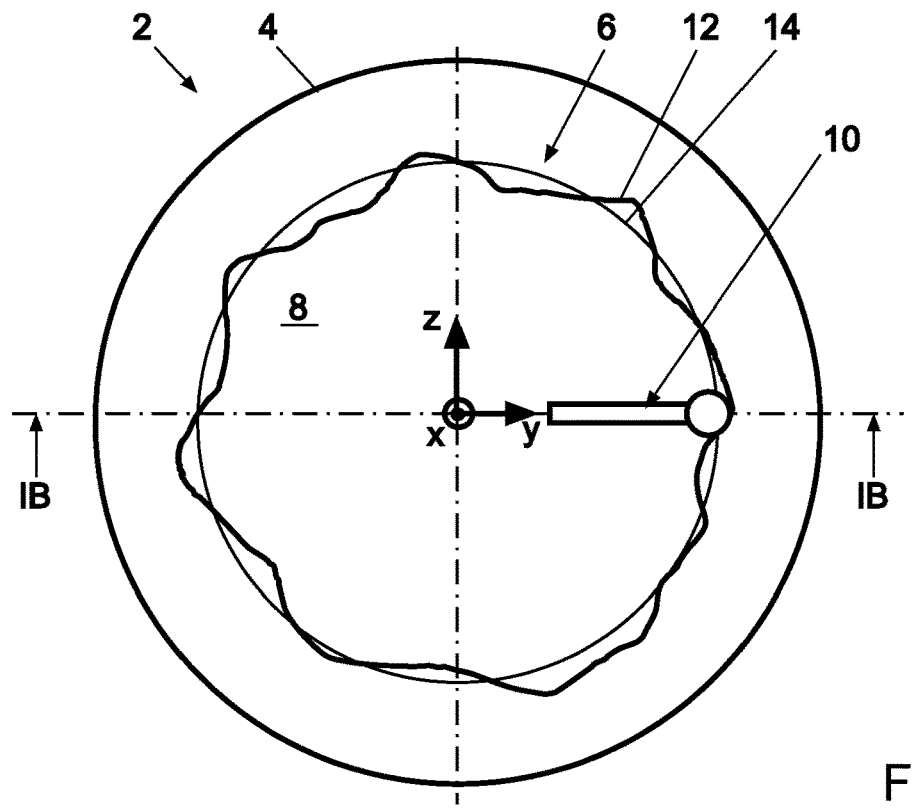
FIG. 1A shows a front view of a workpiece to be measured along its longitudinal axis.
Figure 1B:
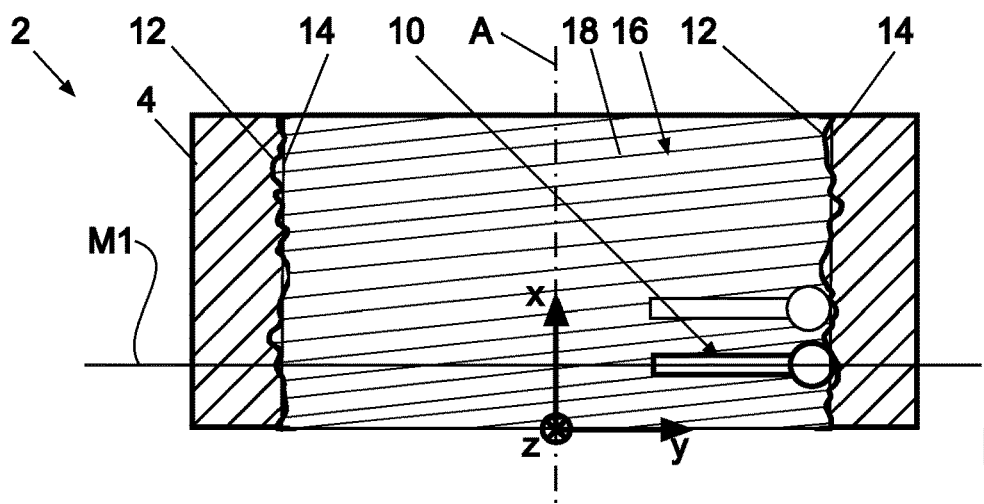

Referring first to FIGS. 1A, 1B and 10, the problem underlying the disclosure will be explained.

FIG. 1A shows a workpiece 2. The workpiece 2 is a hollow cylinder 2 having a circular-cylindrical outer lateral surface 4 and a circular-cylindrical inner lateral surface 6 defining a through-opening 8.

The diameter of the inner lateral surface 6 is to be measured with the aid of a measuring probe 10. In a highly schematized, exaggerated representation, the line 12 represents the actual diameter of the inner lateral surface 6 to be measured. The circle 14 represents the predetermined nominal diameter 14 of the inner lateral surface 6 which should be achieved during the manufacture of the through-opening 8.

Such a diameter is usually measured within a predefined reference plane M1, which is shown in the sectional view according to FIG. 1B. The reference plane M1 is extended parallel to the coordinate plane y-z. The x-value according to the Cartesian coordinate system x, y, z is therefore the same for each point of the plane M.

In other words, the measuring probe 10 is to be held at a constant position throughout the measurement of the diameter as viewed in the x-direction, so that the measuring probe 10 remains within the reference plane M1 or records measured values exclusively within the reference plane M throughout the measurement of the diameter. Typically, in such a measurement task, the workpiece 2 is rotated about its longitudinal axis A, which is collinear to the x-axis, so that the measuring probe 10 experiences and records only deflections in the y-direction.

Depending on how the through-opening 8 has been made on the workpiece 2, the workpiece 2 has a surface structure 16 in the region of the inner lateral surface 6, which is shown in the present case in FIG. 1B by the grooves 18 extending at an angle to the y-z plane.

These grooves 18 of the surface structure 16 may have been formed, for example, in such a way that the through-opening 8 is produced by internal turning with a turning tool. The grooves 18, which may also be referred to herein as turning grooves 18, are substantially helically wound about the x-axis and may cause unwanted guidance during measurement and resultant deflection of the measuring probe in the x-direction, as indicated in FIG. 1B.

This guidance and deflection of the measuring probe 10 from the reference plane M1 may result from the measuring probe 10 being guided within the grooves 18 during measurement as a result of the rotation of the workpiece 2 about the axis A, and being displaced by the grooves in the manner of a worm gear or ball screw drive, in a positive or negative x-direction depending on the direction of rotation of the workpiece 2.

Figure 1C:
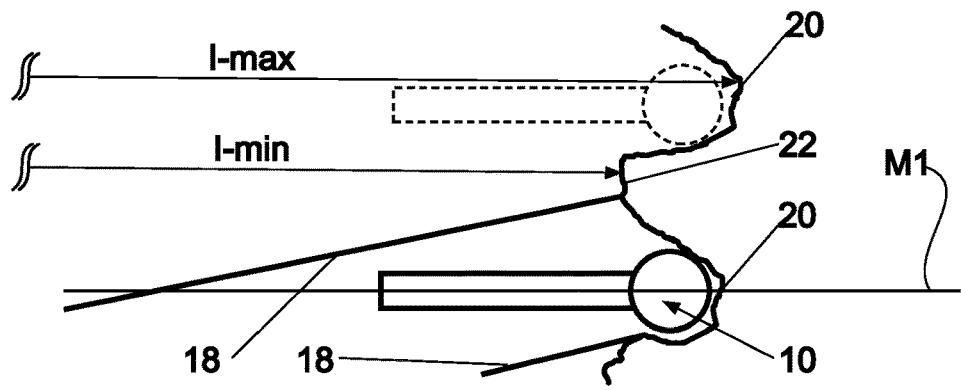
FIG. 1C shows an enlarged representation of a measurement situation.

The challenge here is not initially the displacement of the measuring probe in the x-direction, which can be easily eliminated from the measurement result by calculation, but rather the fact that the measuring probe 10 travels within the grooves 18 during measurement exclusively in valleys 20 of the grooves 18 and does not scan peaks 22 of the grooves 18, as illustrated in FIG. 1C.

Thus, the measuring probe 10 only detects the maximum inner diameter I-max of the through-opening 8, but not the minimum diameter l-min of the through-opening 8. Due to the fact that the measuring probe 10 is guided by the substantially helical surface structure 18, the measurement result is therefore distorted. As a consequence, the measurement results in an actual value for the inner diameter of the through-opening 8 measured here that is too large. Insofar as an outer diameter would be measured, such guiding of the measuring probe in the grooves would result in an actual value for the measured outer diameter that is too small.

Figure 2A:
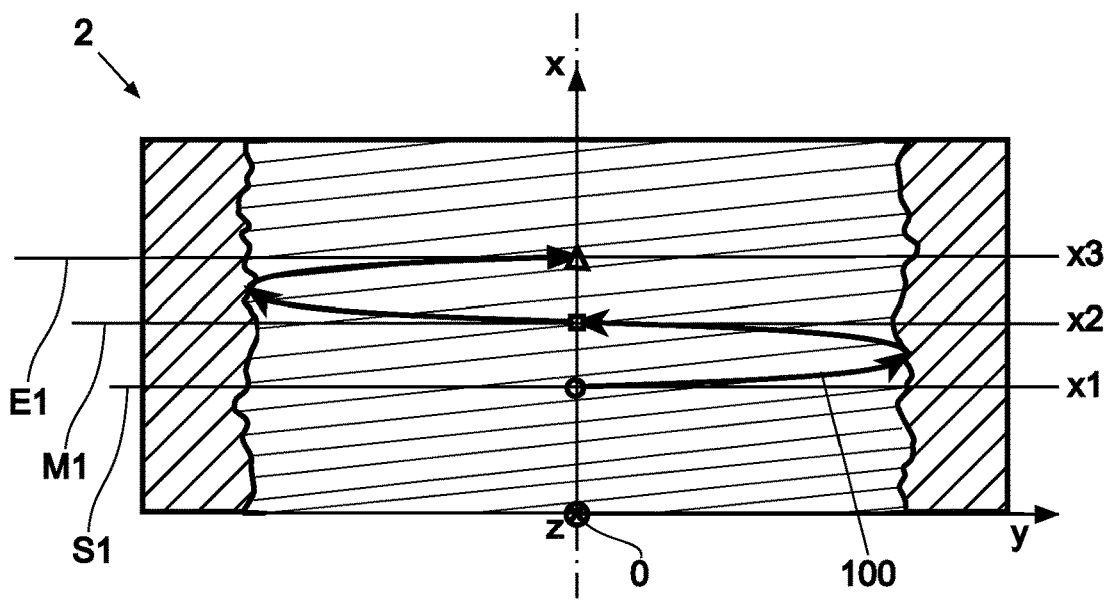
FIG. 2A shows the workpiece of FIG. 1B with a measuring path according to the disclosure.
Figure 2B:
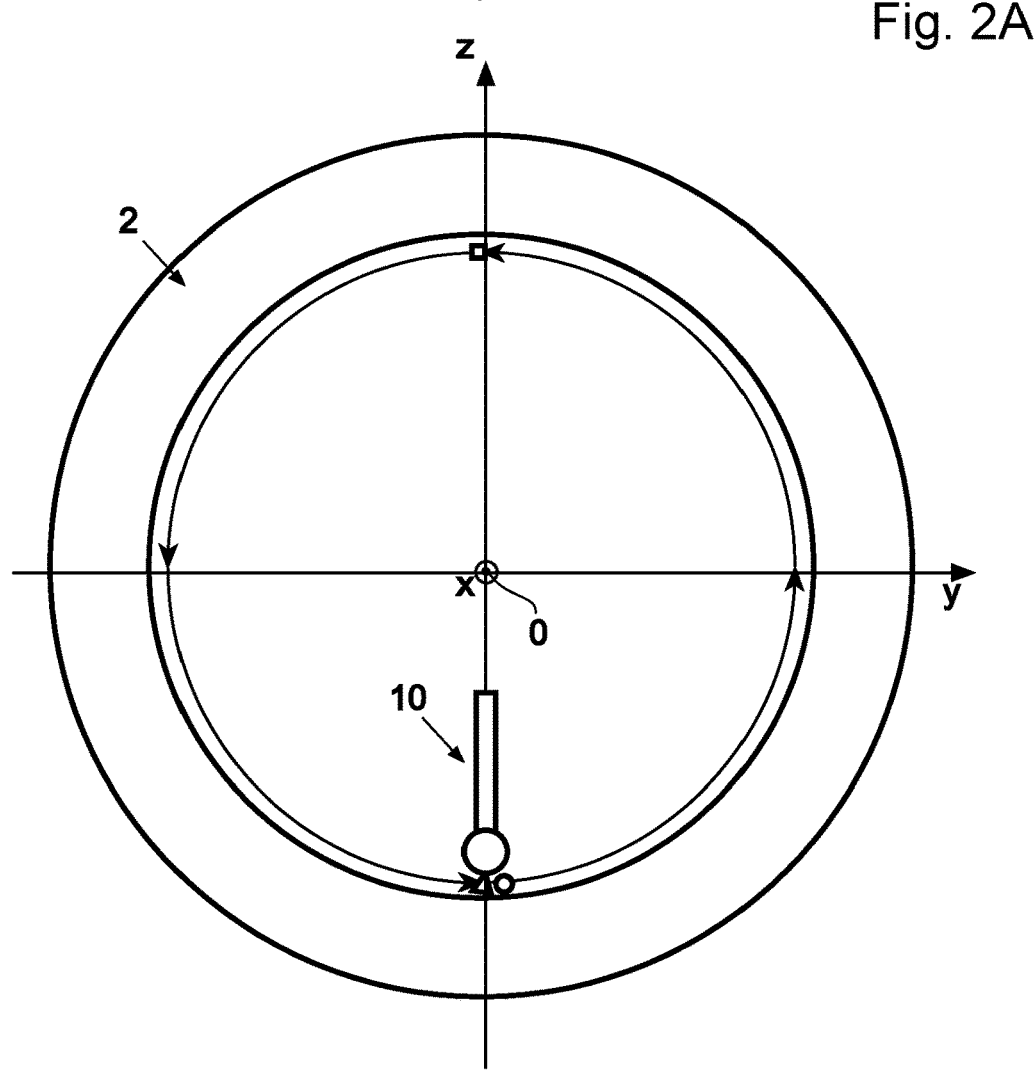
FIG. 2B shows the workpiece of FIG. 1A with a measuring path according to the disclosure.

For the workpiece 2, this problem is solved according to the disclosure by prescribing or defining a measuring path 100 which, at least in sections, lies outside the reference plane M1 within which the diameter to be measured lies (FIG. 2A, FIG. 2B).

The predetermined measuring path 100 starts at a starting point in a starting plane S1, which is at a distance from the reference plane M1. The predetermined measuring path 100 ends at an end point in an end plane E1 which is at a distance from the reference plane M1 (FIG. 2A, FIG. 2B). The measuring path 100 intersects the reference plane M1 at an intersection point. The starting point is indicated by a circle, the intersection point by a square, and the end point by a triangle.

The reference plane M1, the starting plane S1 and the end plane E1 are oriented parallel to the coordinate plane y-z. The starting plane S1 lies in the x-direction at the height x1, the reference plane M at the height x2 and the end plane E1 at the height x3, wherein it holds that x1<x2<x3.

The substantially helical grooves 18 have a negative direction of rotation with respect to the x-axis, while the measuring path 100 has a positive direction of rotation in the opposite direction. In other words, the helical grooves 18 are right ascending while the measuring path 100 is left ascending.

The measuring path 100 therefore crosses the grooves 18 during the measurement, so that the measuring probe 10 traverses both the valleys 20 of the grooves 18 in the x-direction and scans the peaks 22 of the grooves 18. Accordingly, the profile of the grooves 18 can be detected by the measuring path 100 during the measurement of the diameter.

Figure 4:
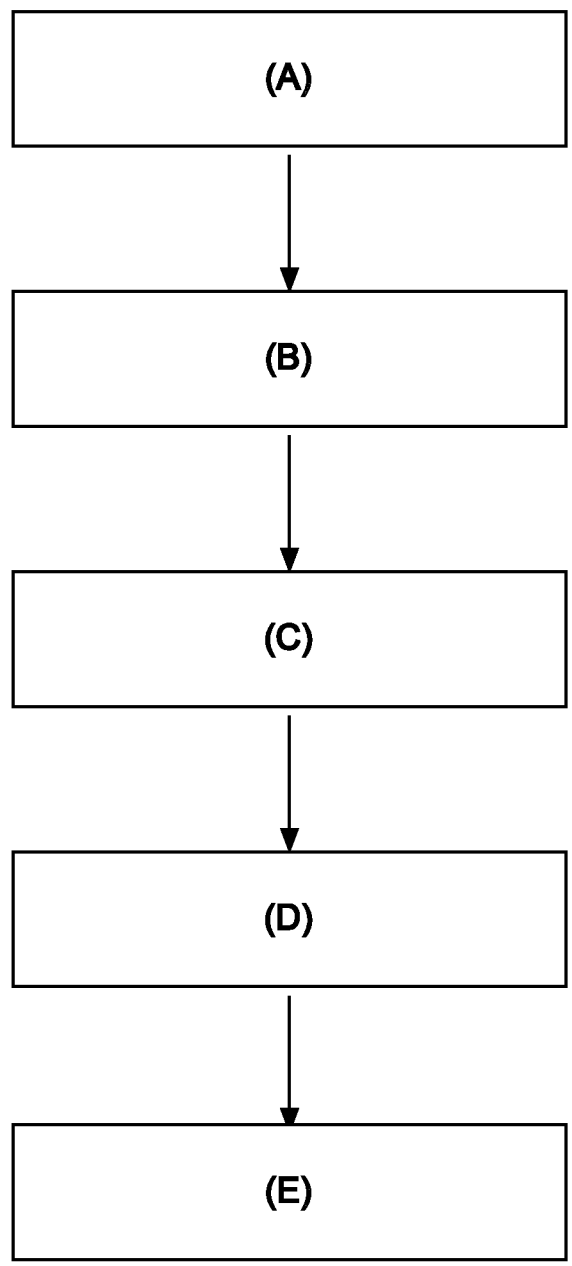
FIG. 4 shows a flow chart of the method according to the disclosure.

A first method according to the disclosure is therefore given, comprising the method steps (FIG. 4) of:

(A) Providing a workpiece 2, wherein the workpiece 2 has a surface 6 having a surface structure 16, wherein the surface structure 16 of the workpiece 2 has grooves 18, the grooves 18 are helical and the grooves 18 have an inclination and a direction of rotation with respect to the reference plane M1, (B) Predefining a geometric measured variable of the workpiece 2, wherein the geometric measured variable is a diameter of the workpiece 2, and wherein the geometric measured variable and a nominal-actual deviation of the geometric measured variable are defined in a reference plane M1, (C) Predefining a measuring path 100, wherein the predefined measuring path 100 lies at least partially outside the reference plane M1, the measuring path 100 crosses the grooves 18 and has a direction of rotation which deviates from the direction of rotation of the grooves 18, and the measuring path 100 is helical;

(D) Tactile sensing of measured values on the workpiece, in which a measuring probe 10 is brought into contact with the surface 6 of the workpiece 2 and the measuring probe 10 scans the workpiece 2 in contact with the surface 6 along the predetermined measuring path 100;

(E) Computational determination of the geometric measured variable and the nominal-actual deviation of the geometric measured variable from the measured values within the reference plane M1, wherein the measured values acquired are projected onto the reference plane.

In the following, a further embodiment of the method is described with reference to FIGS. 3A, 3B, 3C, wherein only the differences from the exemplary embodiment described above are discussed and substantially the same reference signs are assigned to the same features.

Figure 3A:
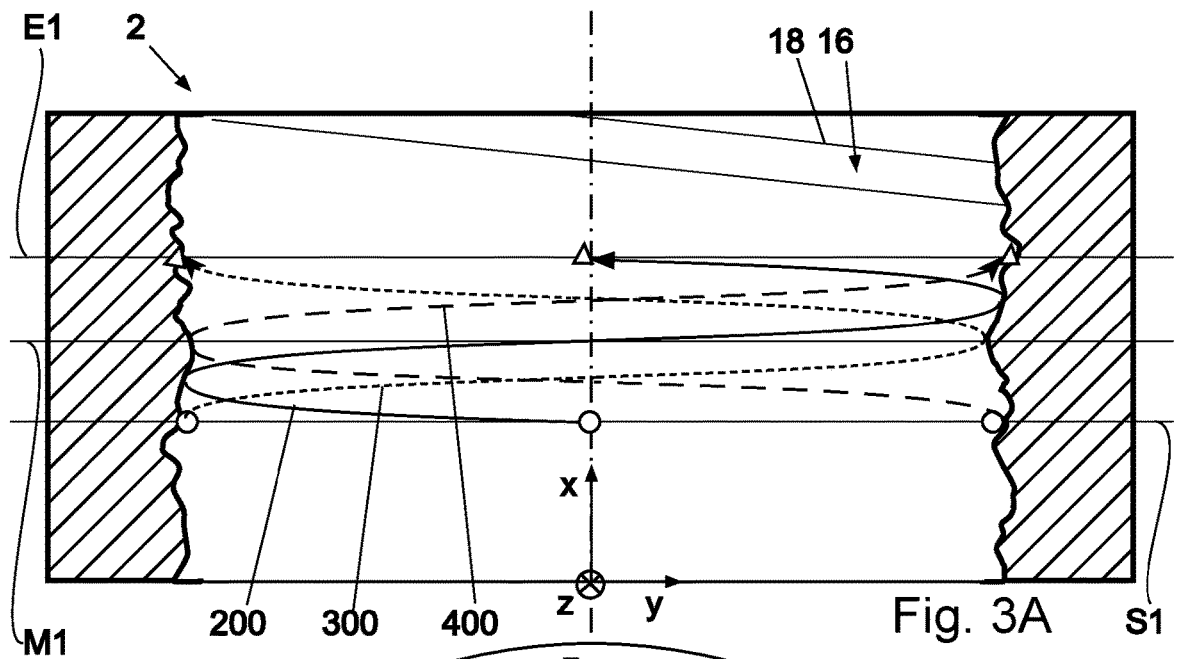
FIG. 3A shows a longitudinal section of a workpiece to be measured with three measuring paths according to the disclosure.

FIG. 3A shows a workpiece 2 which differs from the example described above in that a surface structure 16 has grooves 18 which are opposite to the grooves 18 previously described with reference to FIGS. 1 and 2.

For better clarity, only two grooves 18 are shown in FIG. 3A. In order to be able to better record the profile of the surface structure 16, not only one measuring path is specified for the method variant described herein, but three measuring paths are specified. Therefore, a first measuring path 200 is defined, a second measuring path 300 is defined and a third measuring path 400 is defined.

The starting points of the respective measuring paths 200, 300, 400 are all located in one and the same starting plane S1 and are each marked by circles. The end points of the respective measuring paths 200, 300, 400 are marked by triangles and all lie in the same end plane E1. Each of the measuring paths 200, 300, 400 intersects the reference plane M1 at only one point.

Each of the measuring paths 200, 300, 400 has a direction of rotation that is different or opposite to the grooves 18, is substantially helical in shape and crosses the grooves 18.

The measuring paths 200, 300, 400 differ from each other in that their starting points within the starting plane S1 each have an angular offset from each other. Similarly, the end points of the respective measuring paths 200, 300, 400 in the end plane E2 each have an angular offset from one another. Due to these interleaved measuring spirals 200, 300, 400, different areas of the surface structure 16 can be detected and taken into account within the scope of the computational determination of the diameter.

In particular, the results of the measurements are profile records of the grooves 18 (not shown) which can be superimposed to determine the groove profile, inclination and direction of rotation of the grooves.

Figure 3B:
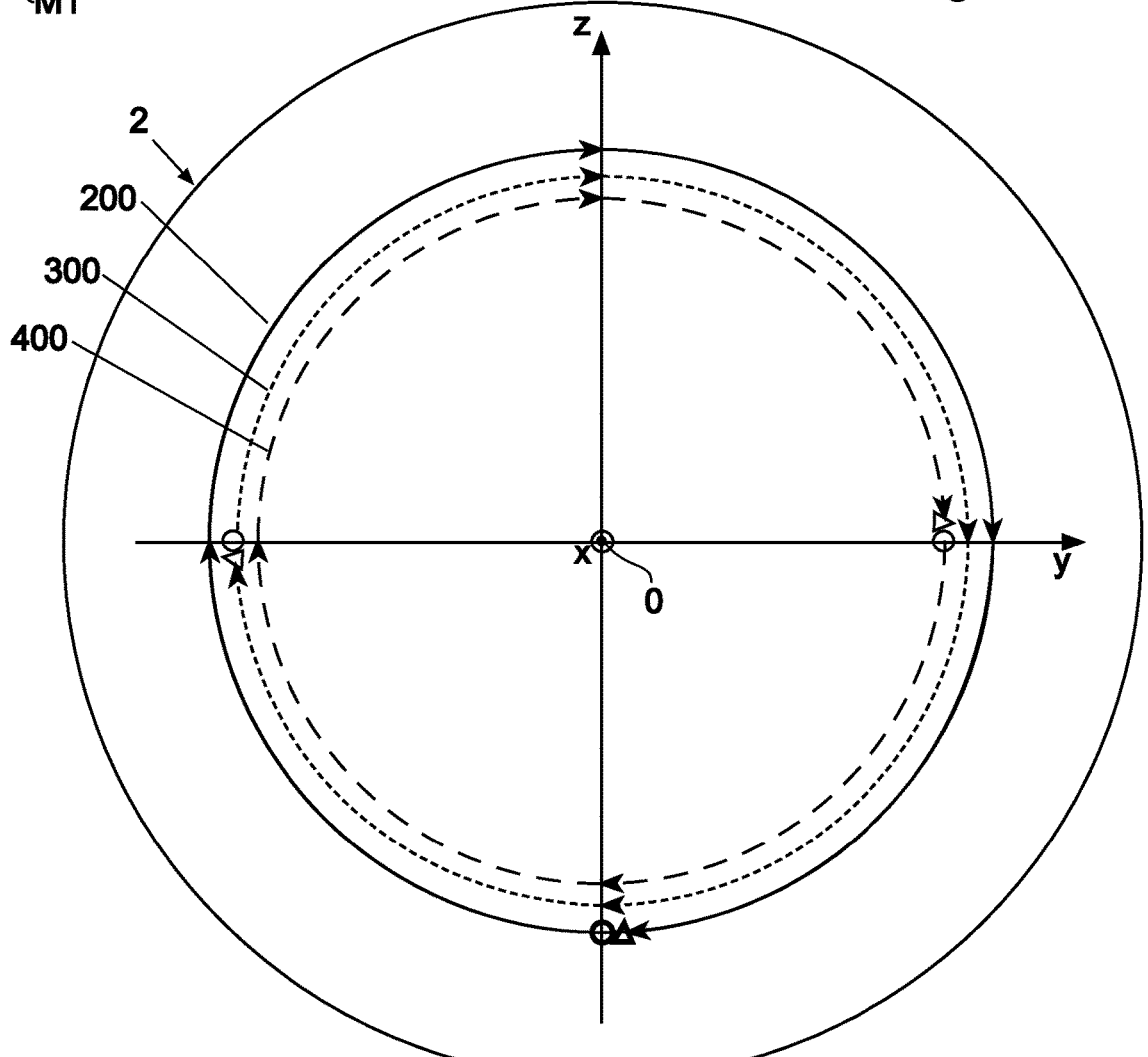
FIG. 3B shows the workpiece from FIG. 1A in a front view along its longitudinal axis.

In the illustration shown in FIG. 3B, the measuring paths are shown radially indented at a distance from each other. However, this is only done to illustrate the respective start and end points of the measuring paths 200, 300, 400 in plan view, wherein it is clear that each of the measuring paths 200, 300, 400 is concerned with the same diameter as a geometric measured variable.

Figure 3C:
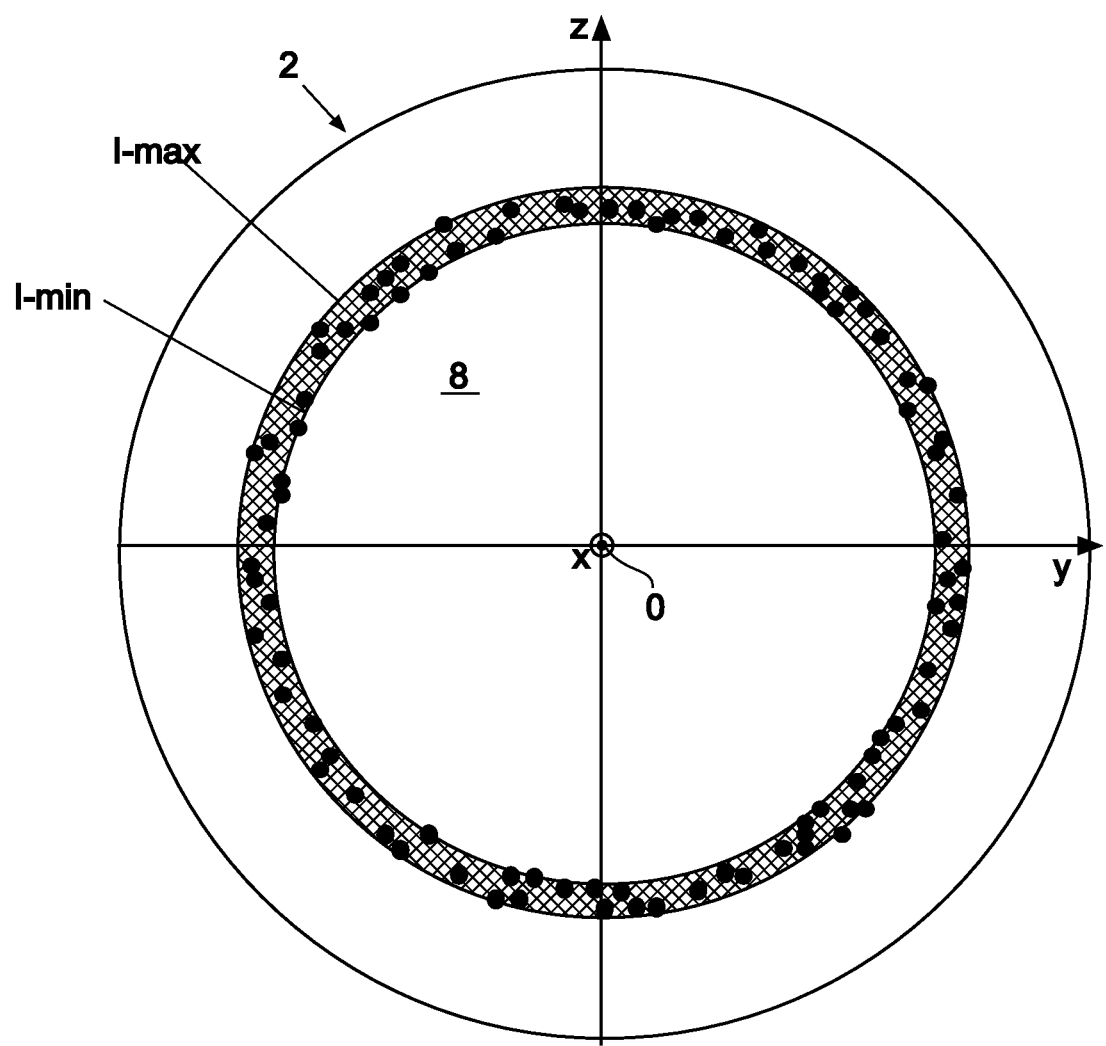
FIG. 3C shows measured values of the measuring paths projected onto the reference plane.

FIG. 3C shows the measuring points projected onto the reference plane from the measurements corresponding to the measuring paths 200, 300, 400. From this, an enveloping circle or a maximum measured diameter I-max and a maximum inscribed circle or a minimum measured diameter I-min can be determined. As a measurement result, a best-fit diameter can be determined by curve fitting from the measured values according to the method of least squares of error and defined as a measured actual diameter. This measured actual diameter can then be compared with the specified nominal diameter in order to check whether a specified tolerance for the through-opening 8 has been maintained.

A second method according to the disclosure is therefore given, comprising the method steps of:

(A) Providing a workpiece 2, wherein the workpiece 2 comprises a surface 6 having a surface structure 16, wherein the surface structure 16 of the workpiece 2 has grooves 18, the grooves 18 are at least helical and the grooves 18 have an inclination and a direction of rotation with respect to the reference plane M1, (B) Predefining a geometric measured variable of the workpiece 2, wherein the geometric measured variable is a diameter of the workpiece 2, and wherein the geometric measured variable and a nominal-actual deviation of the geometric measured variable are defined in a reference plane M1, (C) Predefining three measuring paths 200, 300, 400, wherein the predefined measuring paths 200, 300, 400 lie at least partially outside the reference plane M1, the measuring paths 200, 300, 400 cross the grooves 18 and have a direction of rotation deviating from the grooves 18, and the measuring paths 200, 300, 400 are helical, wherein the starting points of the measuring paths 200, 300, 400 lie in a common starting plane S1, wherein the starting plane S1 is oriented parallel to the reference plane M1, wherein the end points of the measuring paths 200, 300, 400 lie in a common end plane E1, wherein the end plane E1 is oriented in particular parallel to the reference plane M1, and the measuring paths 200, 300, 400 have an angular offset from one another;

(D) Tactile sensing of measured values on the workpiece 2 in which a measuring probe 10 is brought into contact with the surface 6 of the workpiece 2 and the measuring probe 10 scans the workpiece 2 in contact with the surface 6 along predetermined measuring paths 200, 300, 400;

(E) Computational determination of the geometric measured variable and the nominal-actual deviation of the geometric measured variable from the measured values within the reference plane M1, wherein the measured values acquired are projected onto the reference plane M1.

Measuring with three measuring paths 200, 300, 400 may serve to detect the inclination and/or direction of rotation of the grooves 18 in a tactile manner. In particular, measuring with the three measuring paths 200, 300, 400 may serve as a preparatory measurement for a series of subsequent measurements in order to define a single measuring path for subsequent measurements which crosses the grooves 18. This single measuring path may be one of the measuring paths 200, 300, 400 or a different, further measuring path crossing the grooves 18 (not shown). Thus, for a series of components, the inclination and/or direction of rotation of the grooves 18 can first be measured on one component using three measuring paths, and then the measurements of all subsequent components can be performed using a single measuring path derived therefrom to save time. The single measuring path can have a different inclination and/or orientation and/or starting plane and/or end plane from the measuring paths 200, 300, 400.

The invention claimed is:

1. A method for measuring a workpiece, the method including the following steps:
   providing a workpiece, wherein the workpiece has a surface with a surface structure,
   predefining a geometric measured variable of the workpiece,
      wherein the geometric measured variable is a diameter of the workpiece and
      wherein the geometric measured variable and a nominal-actual deviation of the geometric measured variable are defined in a reference plane,
   predefining a measuring path,
   tactile sensing of measured values on the workpiece,
      by bringing a measuring probe into contact with the surface of the workpiece and
      the measuring probe scans the workpiece in contact with the surface along the predetermined measuring path,
   computational determination of the geometric measured variable and the nominal-actual deviation of the geometric measured variable from the measured values within the reference plane,
   wherein the predefined measuring path lies at least partially outside the reference plane.

2. The method according to claim 1, wherein the surface structure of the workpiece comprises grooves.

3. The method according to claim 2,
wherein the grooves are helical at least in sections, and
the grooves have an inclination and a direction of rotation with respect to the reference plane.

4. The method according to claim 3,
wherein the inclination and/or the direction of rotation of the grooves are determined on the basis of manufacturing parameters of a workpiece machining operation which has preceded the provision of the workpiece, and/or
the inclination and/or direction of rotation of the grooves is detected before and/or during tactile measurement.

5. The method according to claim 2, wherein
the measuring path crosses the grooves and, at least in sections, has an inclination and/or direction of rotation which deviates from the inclination and/or direction of rotation of the grooves.

6. The method according to claim 1, wherein
the measuring path is helical at least in sections.

7. The method according to claim 1,
wherein two or more measuring paths are scanned during tactile measurement, and
these measuring paths differ with respect to one or more of the following parameters: starting point of the measuring path, end point of the measuring path, length of the measuring path, direction of rotation of the measuring path, and inclination of the measuring path.

8. The method according to claim 7,
wherein a first measuring path and a second measuring path are predefined,
   wherein a starting point of the first measuring path and a starting point of the second measuring path lie in a common starting plane, wherein the starting plane is oriented in particular parallel to the reference plane, and/or
   wherein an end point of the first measuring path and an end point of the second measuring path lie in a common end plane, wherein the end plane is oriented in particular parallel to the reference plane, and/or
   the first measuring path and the second measuring path have an angular offset relative to one another.

9. The method according to claim 1,
wherein the acquired measured values are projected onto the reference plane.

10. The method according to claim 1,
wherein the workpiece rotates about a longitudinal workpiece axis during measurement
and/or
wherein the measuring probe is freely movable in any spatial direction during the tactile sensing of measured values on the workpiece and is not blocked in any spatial direction.

* * * * *